(12) United States Patent
Shalit et al.

(10) Patent No.: US 9,268,769 B1
(45) Date of Patent: Feb. 23, 2016

(54) SYSTEM, METHOD, AND COMPUTER PROGRAM FOR IDENTIFYING MESSAGE CONTENT TO SEND TO USERS BASED ON USER LANGUAGE CHARACTERISTICS

(71) Applicant: Persado Intellectual Property Limited, London (GB)

(72) Inventors: Avishalom Shalit, Orpington (GB); Assaf Baciu, London (GB); Guy Stephane Krief, Papagou (GR)

(73) Assignee: Persado Intellectual Property Limited, London (GB)

(*) Notice: Subject to any disclaimer, the term of this patent is extended or adjusted under 35 U.S.C. 154(b) by 449 days.

(21) Appl. No.: 13/714,692

(22) Filed: Dec. 14, 2012

Related U.S. Application Data (63) Continuation-in-part of application No. 13/517,032, filed on Jun. 18, 2012.

(60) Provisional application No. 61/577,662, filed on Dec. 20, 2011.

(51) Int. Cl.
*G06F 17/27* (2006.01)
*G06F 17/28* (2006.01)

(52) U.S. Cl.
CPC .................................. *G06F 17/28* (2013.01)

(58) Field of Classification Search
None
See application file for complete search history.

(56) References Cited

U.S. PATENT DOCUMENTS

| | | | | |
|---|---|---|---|---|
| 6,647,383 B1* | 11/2003 | August | ............. | G06F 17/30867 |
| 7,133,834 B1* | 11/2006 | Abelow | ............... | G06Q 10/101 |
| | | | | 705/1.1 |
| 7,363,214 B2* | 4/2008 | Musgrove | ............. | G06F 17/277 |
| | | | | 704/1 |
| 7,945,573 B1* | 5/2011 | Barnes | ................... | G06Q 30/02 |
| | | | | 707/705 |
| 8,762,496 B1* | 6/2014 | Kiveris | .............. | G06Q 30/0251 |
| | | | | 709/203 |
| 2002/0156688 A1* | 10/2002 | Horn | ..................... | G06Q 10/087 |
| | | | | 705/14.51 |
| 2005/0076003 A1* | 4/2005 | DuBose | ................. | G06Q 30/02 |
| 2005/0234850 A1* | 10/2005 | Buchheit | ............... | G06Q 10/10 |
| 2006/0155567 A1* | 7/2006 | Walker | ................. | G06Q 10/107 |
| | | | | 705/7.29 |
| 2007/0153989 A1* | 7/2007 | Howell | ............... | H04M 3/5307 |
| | | | | 379/88.14 |
| 2007/0168863 A1* | 7/2007 | Blattner | .................. | G06F 3/011 |
| | | | | 715/706 |
| 2008/0109285 A1* | 5/2008 | Reuther | ............ | G06F 17/30864 |
| | | | | 705/7.11 |
| 2008/0281627 A1* | 11/2008 | Chang | .............. | G06Q 10/06375 |
| | | | | 705/7.39 |
| 2008/0313259 A1* | 12/2008 | Correa | ............. | G06Q 10/06375 |
| | | | | 709/201 |
| 2009/0150400 A1* | 6/2009 | Abu-Hakima | .... | G06F 17/30864 |
| 2009/0177750 A1* | 7/2009 | Lee | ...................... | G06Q 10/107 |
| | | | | 709/206 |
| 2009/0210899 A1* | 8/2009 | Lawrence-Apfelbaum | | H04L 12/2801 |
| | | | | 725/34 |
| 2009/0276419 A1* | 11/2009 | Jones | ................. | G06F 17/30637 |
| 2010/0312769 A1* | 12/2010 | Bailey | ............... | G06F 17/30705 |
| | | | | 707/740 |

(Continued)

*Primary Examiner* — Richemond Dorvil
*Assistant Examiner* — Thuykhanh Le
(74) *Attorney, Agent, or Firm* — Lessani Law Group, PC (57) ABSTRACT

A system, method, and computer program are provided for identifying message content to send to users based on the users' language characteristics. Language characteristics are extracted from user-generated content and language characteristic scores are assigned to each user. The users are clustered into groups using the language characteristic scores. The system sends test messages with different message content to at least a subset of each group's users and the response rates are measured. For each group, a message content to which the group is most responsive is identified and is associated with the group. Language characteristics from a new user's user-generated content are extracted and language characteristic scores are assigned to the new user. The group to which the new user belongs is identified using the new user's language characteristic scores. A message is sent to the new user with the message content previously associated with the identified group.

23 Claims, 6 Drawing Sheets

(56) References Cited

U.S. PATENT DOCUMENTS

| | | | | |
|---|---|---|---|---|
| 2012/0005041 | A1* | 1/2012 | Mehta | G06Q 30/0601 705/27.1 |
| 2012/0016661 | A1* | 1/2012 | Pinkas | G06F 17/2785 704/9 |
| 2012/0095831 | A1* | 4/2012 | Aaltonen | G06Q 30/02 705/14.52 |
| 2012/0166345 | A1* | 6/2012 | Klemm | G06Q 30/016 705/304 |
| 2012/0259620 | A1* | 10/2012 | Vratskides | G06Q 30/02 704/9 |
| 2013/0346870 | A1* | 12/2013 | Greenzeiger | G06Q 30/0241 715/733 |
| 2014/0104370 | A1* | 4/2014 | Calman | G06Q 30/00 348/14.08 |

* cited by examiner

SYSTEM, METHOD, AND COMPUTER PROGRAM FOR IDENTIFYING MESSAGE CONTENT TO SEND TO USERS BASED ON USER LANGUAGE CHARACTERISTICS

RELATED APPLICATIONS

This application claims the benefit of U.S. Provisional Application No. 61/577,662, filed on Dec. 20, 2011, and titled "System and Method for Deriving Distinguishing Information about a User from the Characteristics of a User's Own Language," and is also a continuation-in-part of U.S. application Ser. No. 13/517,032 filed on Jun. 18, 2012 and titled "Message Optimization." The contents of both applications are incorporated by reference as if fully disclosed herein.

BACKGROUND OF THE INVENTION

1. Field of the Invention

This invention relates generally to a message optimization system and, more particularly, to a system and method for identifying the optimal message content to send to users based on the users' language characteristics.

2. Description of the Background Art

Commercial advertising has undergone a significant shift in the past decade. Traditional media advertising, taking the form of newspapers, magazines, television commercials, radio advertising, outdoor advertising, and direct mail, etc., has been decreasing as the primary method of reaching an audience, especially as related to certain target demographics or types of products. New media advertising, in the form of Popup, Flash, banner, Popunder, advergaming, email advertising, mobile advertising, etc., has been increasing in prominence.

One characteristic of new media advertising is the need to capture an audience's (viewers, readers, or listeners) attention with limited text. For example, with a banner or text message, the sponsor of the advertising message may only have a finite number of characters to persuade its audience to act by clicking on a link, texting back a message, etc. As a result, companies are increasingly interested in how to optimize their message, and the components in the message, to increase the message's response rate. International Publication Number WO 2011/076318 A1 discloses a system and method for optimizing a message and is incorporated by reference herein in its entirety. In this system, the message is divided into components and multiple values are tested for each component to determine the best response rates.

Different segments of the population may respond differently to messages. For example, male recipients may respond differently than female recipients, and urban recipients may respond differently than rural recipients. The potency of marketing messages may be increased by grouping message recipients into various segments and identify the message that works best for each segments. Therefore, it is desirable to find new ways to segment users and target messages to them.

SUMMARY OF THE INVENTION

The present invention is directed to a system, method, and computer program for identifying message content to send to users based on the users' language characteristics. User-generated content (i.e., written or voice data) for a plurality of users is obtained, where each content item is associated with a user identification (ID) that uniquely identifies the user that generated the content item. The language characteristics are extracted from the user-generated content and one or more language characteristic scores are assigned to each of the users. Language characteristics may include vocabulary used or morphology characteristics. The users are clustered into groups using the language characteristic scores.

The responsiveness of each group to different message content is tested by sending a plurality of test messages with different message content to at least a subset of users within each group. For example, the message content may be a certain product or the use of certain vocabulary in a product offer. Each group may be tested by sending a plurality of test messages to at least a subset of users within each group with offers of different products or using certain vocabulary to offer the products. The response rates to the test messages are then measured. For each group, a message content to which the group is most responsive is identified (e.g., a best product and/or vocabulary) and the message content is associated with the group.

The foregoing steps essentially create a dataset that maps language characteristics to message content. Once the best message content is identified for each group, this information is used to determine message content to send to new users (i.e., users that were not a part of the clustering process). User-generated content for a new user is then obtained. The language characteristics from the new user's user-generated content are extracted. One or more language characteristic scores are assigned to the new user. The group to which the new user belongs is identified using the new user's language characteristic scores. A message is sent to the new user with the message content previously associated with the user's group. In one embodiment, the steps pertaining to the new user are performed on a client device of the new user by a client application that execute rules that map each group to a select message.

DETAILED DESCRIPTION OF THE PREFERRED EMBODIMENTS

Figure 1:
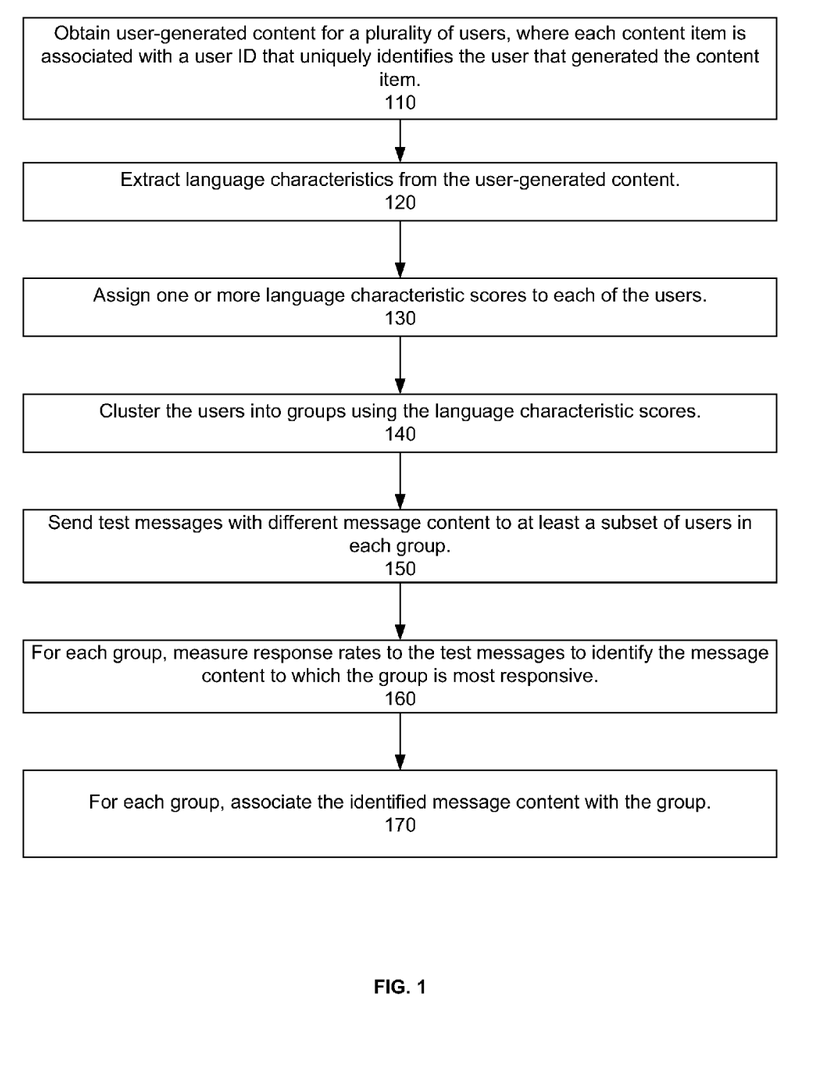
FIG. 1 is a flowchart that illustrates a method, according to one embodiment of the invention, for grouping users based on language characteristics and identifying an optimized message content for each group.

The present invention provides a system, method, and computer program for identifying the optimal message content to send to users based on the users' language characteristics. In the preferred embodiment as seen in FIG. 1, user-generated content for a plurality of users is obtained, where each content item is associated with a user identification (ID) that uniquely identifies the user that generated the content item (step 110). User-generated content may be any written or voice data originating from the user. Such data may be public (e.g., a public forum post, a public profile update, etc.), semi-private (e.g., a closed group chat, email, text, etc.), or private (i.e., data having no visibility).

Language characteristics are extracted from the user-generated content (step 120). One or more language characteristic scores are assigned to each of the users (step 130). The language characteristics on which the users are scored may include the vocabulary characteristics or the morphology characteristics of the language. Examples of vocabulary characteristics include the presence or absence of specific words, the frequency (absolute or relative to others) of certain words, etc. Morphology characteristics are the structure or form of the language, such as punctuation, capitalization, spelling errors, grammar errors, etc. For example, users may be scored based on spelling errors (a general count and a count for typical words that are misspelled), grammar, punctuation, acronyms, slang, user-created words, emoticons, level of formality, foreign language words, specialty words (e.g., rare, fancy, archaic, or domain-specific words), etc.

Below are example language characteristic scores assigned to a user:
 (i) Spelling errors per word: 0.1
  (number of spelling errors)/(number of words)=3/30=0.1
 (ii) Error Groups:
  Missing vowels (e.g., "see you next thrsday"): 0.05
   (number of missing vowels)/(number of characters) =1/20=0.05
  Adjacent letter typos (e.g., "new yrok city"): 0.08
   (number of adj. letter typos)/(number of characters) =1/13=0.08
 (iii) User-created words (e.g., "misunderestimate"): 0.04
  (number of user-created words)/(number of words)=1/25=0.04
 (iv) New words (e.g., youth slang): 0.01
  (number of new words)/(number of words)=1/100=0.01
 (v) Grammar rating: 12.0
  Using a standard metric (e.g., Coleman Liau Index, Flesch Kincaid Grade Level, Automated Readability Index (ARI), etc.)
 (vi) Punctuation and capitalization: 10.0
  Using a standard metric (e.g., Coleman Liau Index, Flesch Kincaid Grade Level, Automated Readability Index (ARI), etc.)
 (vii) Foreign language (e.g., Spanish): 0.3
  (number of foreign words)/(number of words)=6/20=0.3
 (viii) Specialty words (e.g., fancy, archaic, domain specific words, etc.)
  (e.g., Electrical Engineering): 0.4
   (number of specialty words)/(number of words)=12/30=0.4

The users are clustered into groups using the numerical value of the features (e.g., language characteristic scores) (step 140). Various types of algorithms may be used for clustering, including, for example, k-means, GMM, EM, various hierarchical methods, and possibly also spectral methods for dimensionality reduction, as would be known to a person skilled in the art. Another option would be to use bi-clustering (co-clustering) to cluster both the groups of users and the groups of terms prevalent for those groups of users.

In one embodiment, using a co-clustering algorithm, a matrix of size N by K is defined, where N is the number of users (e.g., 10 million) and K is the number of features (i.e., language characteristics such as discussed above) (e.g., 5000). Each element in the matrix describes the relationship between the user and a unique term (hence, user-term) (e.g., the presence of specific words, grammatical errors, spelling mistakes, or unique grammatical structures, etc.) and is normalized (i.e., proportional to the probability (in the "author attribution" sense) of identifying a text with a user given that the term was used in the text). This relationship (user-term) can be defined in many ways, such as, for example, the number of times the user has used a term divided by the number of times any individual has used the term. In certain embodiments, the probability of the user given the term can be refined (e.g., by Laplace smoothing). The resulting matrix may then be co-clustered (e.g., by sparse singular value decomposition) to yield both clusters of users and clusters of terms.

In addition to clustering users based on language characteristic scores, users may be clustered based on one or more non-language characteristics. For example, users may be clustered by geography, age, education level, and/or gender, as well as language characteristics.

Test messages are sent with different message content to at least a subset of users in each group (step 150). For each group, the response rates to the test messages are measured to identify the message content to which the group is most responsive (step 160). An exemplary description of sending test messages and measuring response rates may be found in U.S. application Ser. No. 13/517,032, filed on Jun. 18, 2012 and U.S. application Ser. No. 13/290,051 filed on Nov. 4, 2011, both of which are incorporated by reference as if fully disclosed herein. In certain embodiments, the responses to test messages are analyzed to determine if delimitations between clusters are valid. For example, if two clusters have the same optimal message content, then those clusters are combined. For each group, the identified message content is associated with the group (step 170).

In certain embodiments, test messages are sent with offers of different products to at least a subset of users in each group. For each group, the response rates to the test messages are measured to identify the product to which the group is most responsive. For each group, the identified product is associated with the group. In certain embodiments, the best product is determined while keeping the vocabularies between the test messages constant. Once the best product has been determined, test messages are sent with offers of the best product for the group and certain different vocabularies to at least a subset of users in each group. For each group, the response rates to the test messages are measured to identify the vocabularies to which the group is most responsive. For example, keeping the offer for a hamburger constant, certain users may receive a test message having the phrase "Great deal!" while other users may receive a test message having the phrase "Limited time offer!" For each group, the best product or product offer and certain vocabularies may be the message content that is associated with the group. In certain embodiments, instead of certain vocabularies being associated with the group (e.g., certain word choices), certain vocabulary rules may be associated with the group (e.g., do not use slang).

Figure 2:
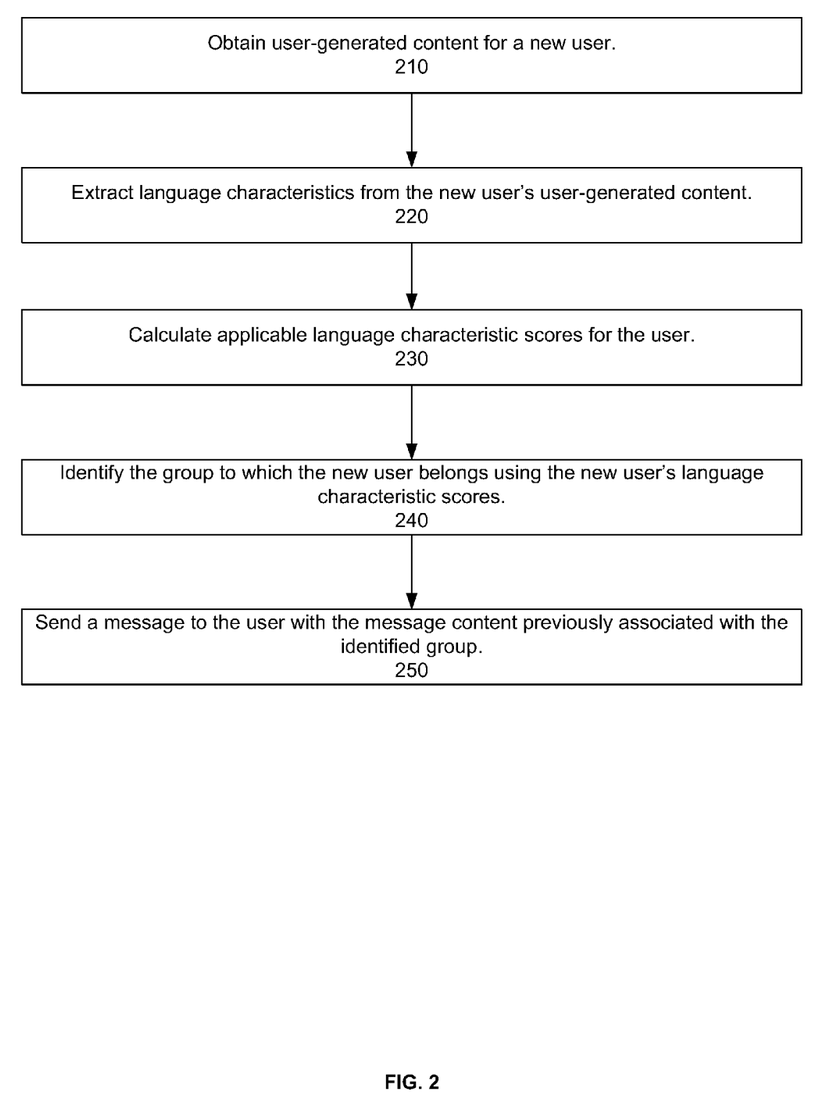
FIG. 2 is a flowchart that illustrates a method, according to one embodiment of the invention, for identifying a message to send to a new user based on the user's language characteristics and the information obtained in FIG. 1.

The foregoing steps essentially create a dataset that maps language characteristics to message content. Once the best message content is identified for each group, this information is used to determine message content to send to new users (i.e., users that were not a part of the clustering process). As seen in FIG. 2, user-generated content is then obtained for a new user (step 210). Language characteristics are extracted from the new user's user-generated content (step 220). The applicable language characteristics scores are calculated for and assigned to the user (step 230). The group to which the new user belongs is identified using the new user's language characteristics scores (step 240). A message is sent to the user with the message content previously associated with the identified group (step 250). In certain embodiments as seen in FIG. 5*b*, the steps of FIG. 2 pertaining to the new user are performed on a client device of the new user by a client application that executes rules that map each group to a select message.

Figure 3:
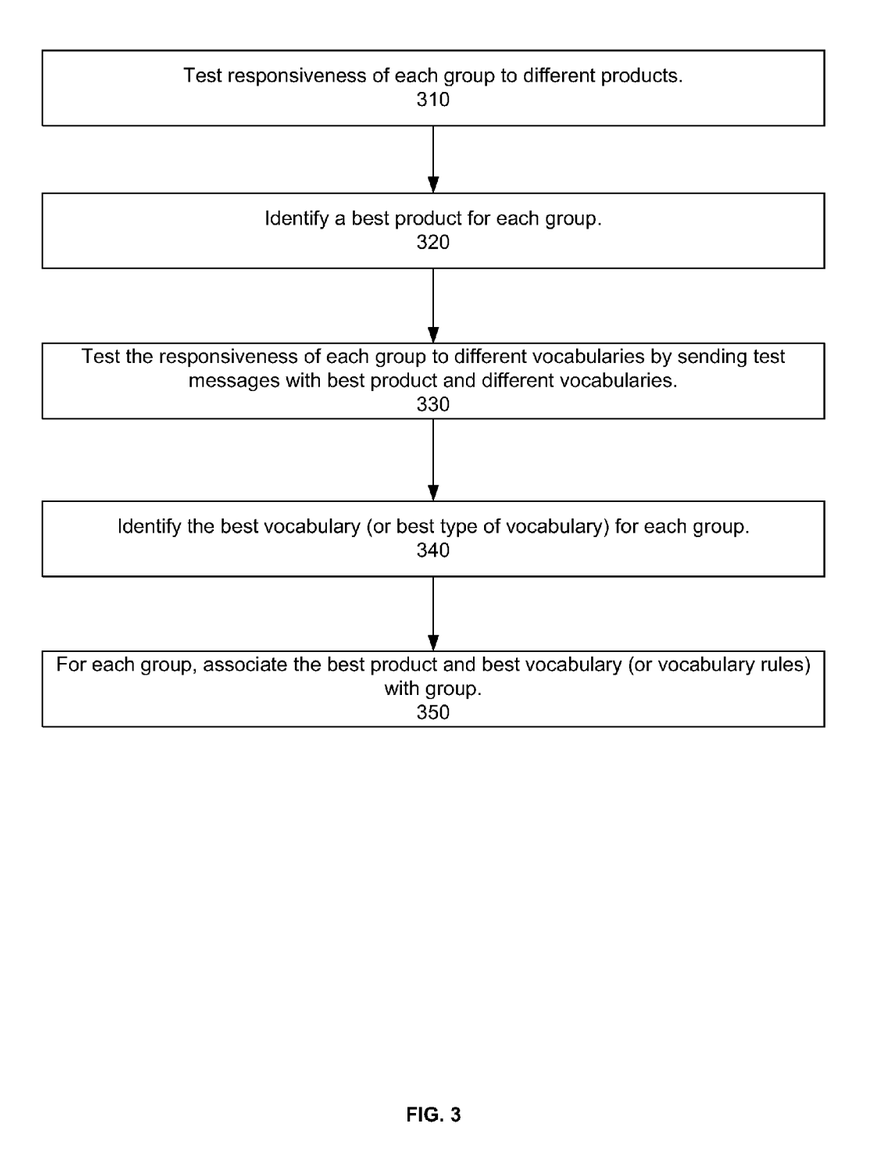
FIG. 3 is a flowchart that illustrates a method for testing the responsiveness of groups to different message content according to one embodiment of the invention.

FIG. 3 illustrates an example of how to test the responsiveness of each group to different message content (e.g., different products). First, the responsiveness of each group to different products is tested by sending test messages offering the different products to each group (step 310). The best product is identified for each group (step 320). To test the responsiveness of each group to different vocabularies, test messages are sent with the best product for the group and different vocabularies (step 330). The best vocabulary (or best type of vocabulary) is identified for each group (step 340). For each group, the best product and best vocabulary (or vocabulary rules) are associated with the group (step 350).

The methods described with respect to FIGS. 1-3 are embodied in software and performed by a computer system (comprising one or more computing devices) executing the software. A person skilled in the art would understand that a computer system has a memory or other physical, computer-readable storage medium for storing software instructions and one or more processors for executing the software instructions.

Figure 4:
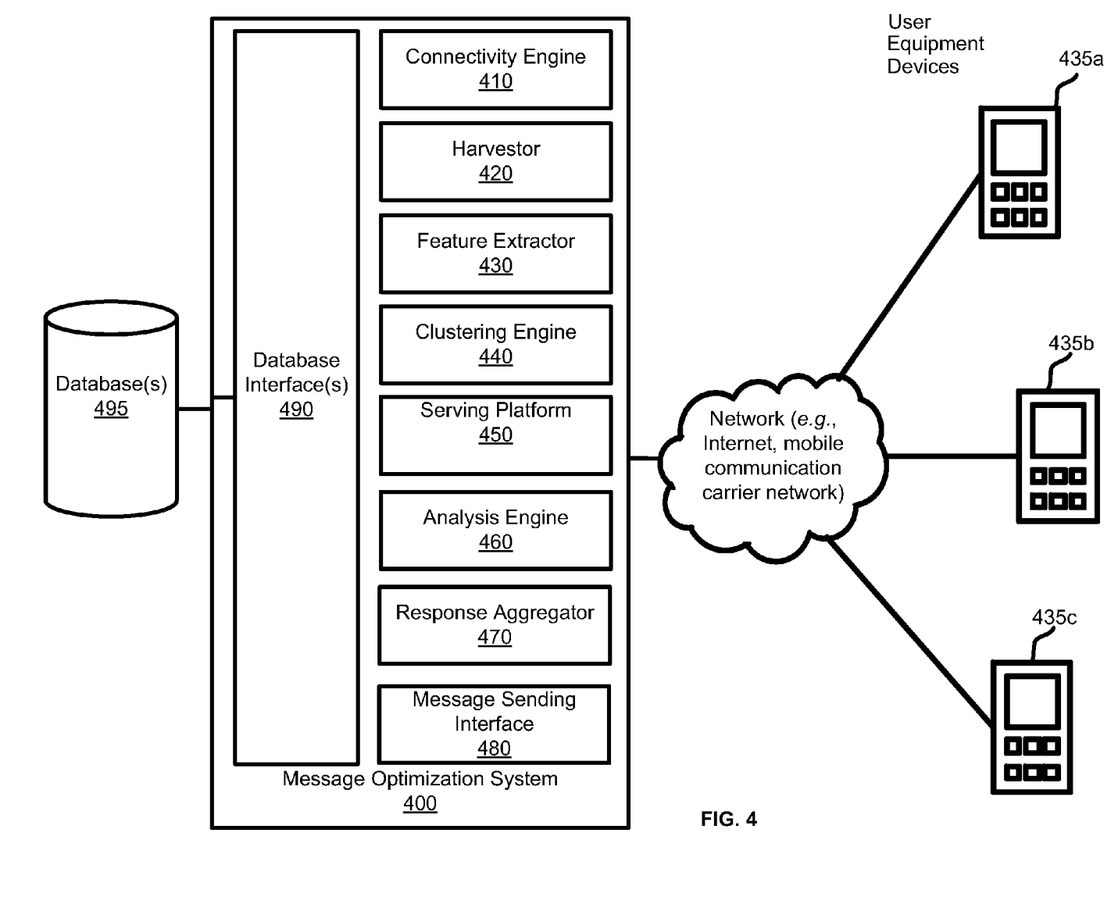
FIG. 4 is a block diagram of a message optimization system according to one embodiment of the invention.

FIG. 4 illustrates a message optimization system 400 according to one embodiment of the invention. As a person skilled in the art would understand, the message optimization system 400 may be constructed in any number of ways within the scope of the present invention. The methods of FIGS. 1-3 may be implemented in other systems, and the invention is not limited to system 400.

The message optimization system 400 includes a connectivity engine 410, a harvester 420, a feature extractor 430, a clustering engine 440, a serving platform 450, an analysis engine 460, a response aggregator 470, a message-sending interface 480, and one or more database interfaces 490. The connectivity engine 410 connects the message optimization system 400 with the Internet (e.g., FACEBOOK) or with software on a client device (e.g., SKYPE) to collect user-generated content. As seen in FIG. 4, the message optimization system 400 may be connected via a network (e.g., Internet, mobile communication carrier network, etc.) to one or more client devices 435*a*, 435*b*, 435*c*.

The harvester 420 receives user-generated content and puts it in one or more databases 495. The feature extractor 430 takes the user-generated content, extracts the language characteristics, and calculates one or more language characteristic scores. These scores may be based on vocabulary vectors and/or the presence or absence of certain language characteristics. User scores are also stored in the one or more databases 495. Examples of parsing or extraction tools include Python's "ntlk" package or Perl's "Lingua." The clustering engine 440 retrieves user-generated content, runs it through the feature extractor 430 to obtain language characteristic scores, and clusters users into groups using the language characteristic scores.

The serving platform 450 uses the clustering engine 440 and the results saved by the analysis engine 460 to assign a new user to a group and to determine the message content to send to the user. The analysis engine 460 analyzes the effects of different message content on each group to identify the best message content for each group. It then stores the results in the one or more databases 495. In addition, the analysis engine 460 verifies the validity of the cluster delimitations. The response aggregator 470 receives and aggregates responses to test messages, which is used by the analysis engine 460. The message-sending interface 480 sends messages to the users. The one or more database interfaces 490 interface with the one or more databases 495. The components illustrated in FIG. 4 may be distributed across a plurality of servers.

Figure 5A:
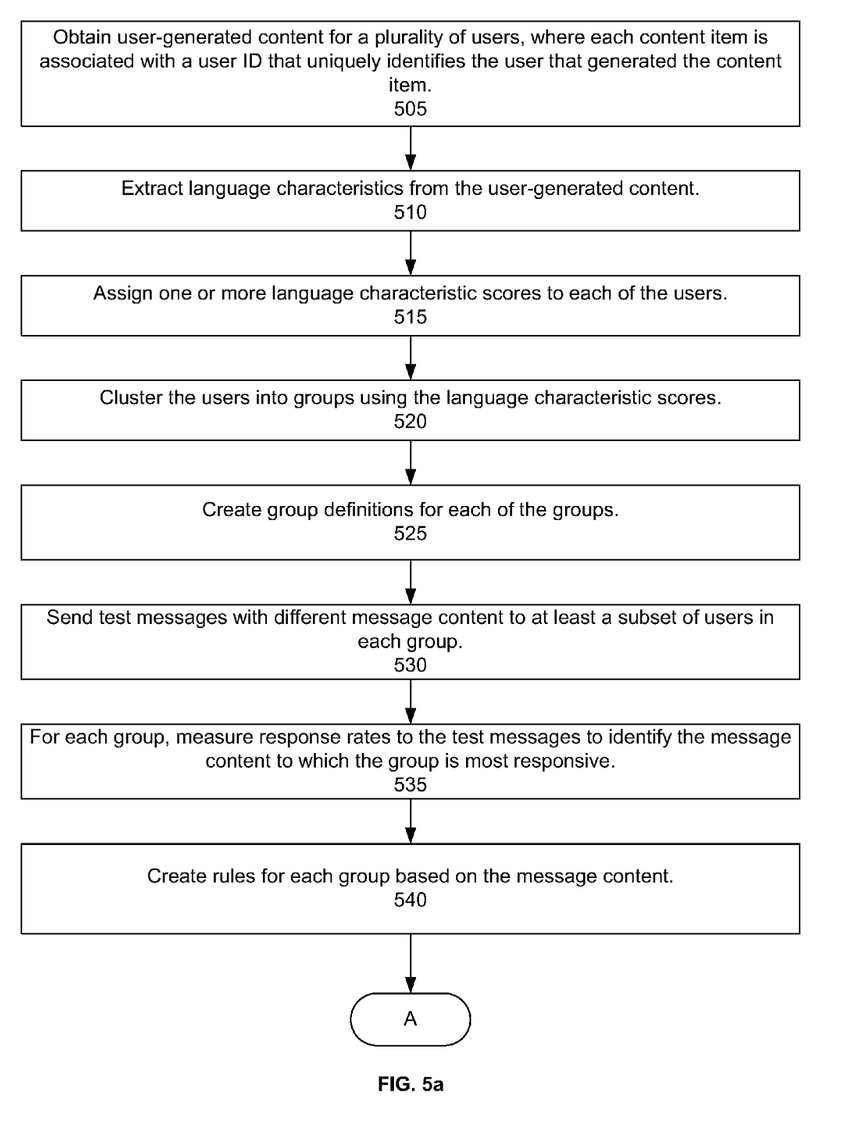
FIGS. 5a-5b are a flowchart that illustrates a semi-private method for identifying message content to send to users based on the users' language characteristics according to one embodiment of the invention.
Figure 5B:
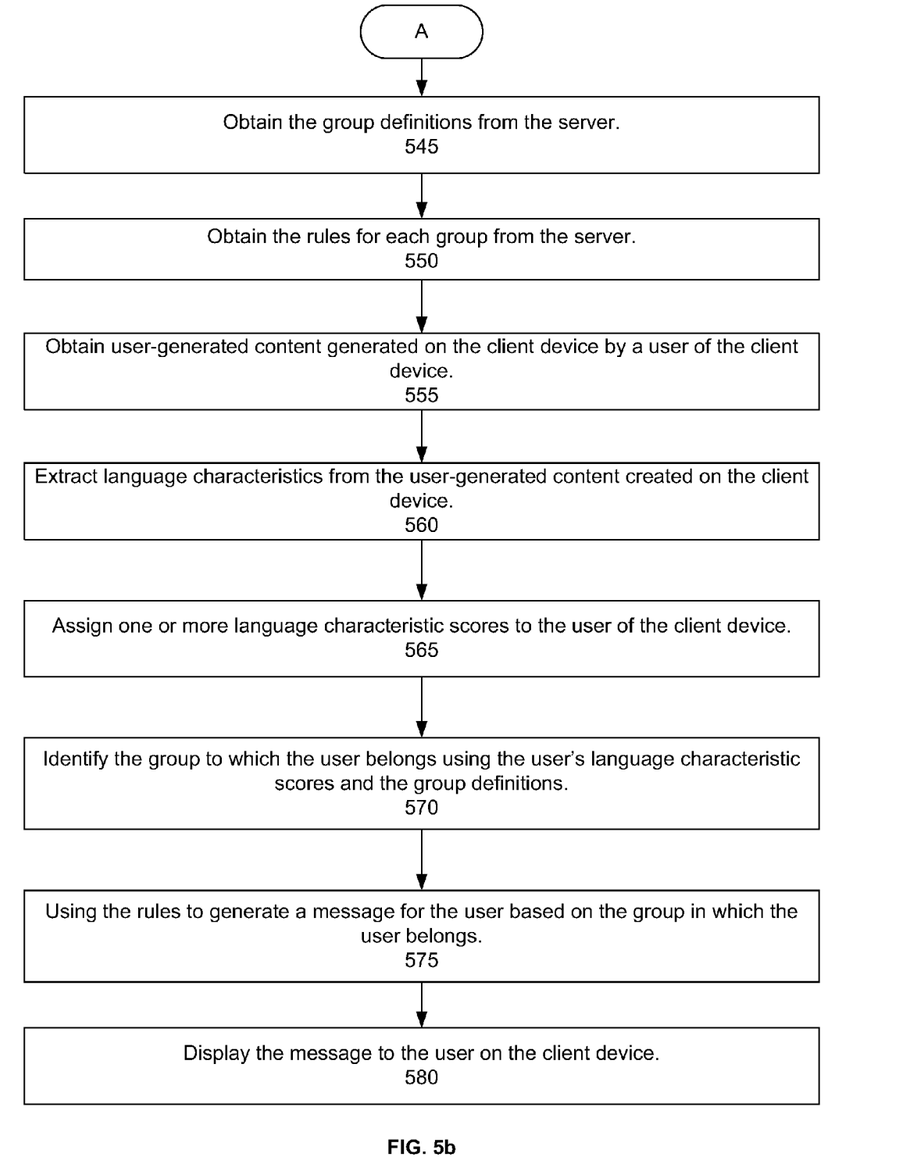

FIGS. 5*a*-5*b* illustrate another method performed by a system for identifying message content to send to users based on the users' language characteristics. In contrast to FIGS. 1 and 2, which are performed entirely by a message optimization system, such as message optimization system 400, FIGS. 5*a*-5*b* recognize that due to privacy concerns some of the user-generated content may need to remain on the client device. As a result, part of the message optimization method may be performed by a client application on one or more client devices.

As seen in FIG. 5*a*, a server obtains user-generated content for a plurality of users, where each content item is associated with a user ID that uniquely identifies the user that generated the content item (step 505). It then extracts language characteristics from the user-generated content (step 510). One or more language characteristic scores are assigned to each of the users (step 515). The users are then clustered into groups using the language characteristic scores (step 520). The server then creates group definitions for each of the groups (step 525). Test messages are sent with different message content to at least a subset of users in each group (step 530). For each group, the response rates to the test messages are measured to identify the message content to which the group is most responsive (step 535). Rules are created for each group based on the message content (step 540).

As seen in FIG. 5*b*, a client application on a client device obtains the group definitions from the server (step 545). It also obtains rules for each group from the server (step 550). User-generated content (e.g., chat, email, text, etc.) generated on the client device by a user of the client device is also obtained (step 555). Such content may be obtained from a Voice over IP (VoIP) client application, an email client application, a text messaging (SMS) client application, etc. Language characteristics from the user-generated content created on the client device is extracted (step 560). The client application then assigns one or more language characteristic scores to the user of the client device (step 565). It then identifies the group to which the user belongs using the user's language characteristic scores and the group definitions (step 570). Using the rules obtained from the server, the client application generates a message for the user based on the group in which the user belongs (step 575). The message is displayed to the user on the client device (step 580). Alternately, the client application may inform the server of which message to send to the user, and the user then sends the message to the user on the same client device or a different device.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method, performed by a computer system, for identifying message content to send to users based on the users' language characteristics, the method comprising:

obtaining user-generated content for a plurality of users, wherein each content item is associated with a user ID that uniquely identifies the user that generated the content item;

extracting language characteristics from the user-generated content;

assigning one or more language characteristic scores to each of the users;

clustering the users into groups using the language characteristic scores;

testing the responsiveness of each group to different message content by sending a plurality of test messages with different message content to at least a subset of users within each group and measuring the response rates to the test messages;

associating different message content with different language characteristic scores by identifying a message content to which each of the groups is most responsive and associating the message content with the group;

obtaining user-generated content for a new user;

extracting language characteristics from the new user's user-generated content;

assigning one or more language characteristic scores to the new user; and sending a message to the new user with the message content previously associated with users having similar language characteristic score(s).

2. The method of claim 1, wherein testing the responsiveness of each group to different message content comprises testing the responsiveness of each group to offers of different products to identify a best product for each group.

3. The method of claim 2, wherein, after a best product for each group is identified, testing the responsiveness of each group to certain vocabularies by sending test messages to at least a subset of users in each group that include an offer for the best product for the group and the certain vocabularies.

4. The method of claim 3, wherein, for each group, the message content associated with the group comprises the best product for the group and the vocabulary to which the group is most responsive.

5. The method of claim 1, wherein associating a message content with a group comprises associating a certain vocabulary with the group.

6. The method of claim 1, wherein associating a message content with the group comprises associating certain vocabulary rules with the group.

7. The method of claim 1, wherein the steps pertaining to the new user are performed on a client device of the new user by a client application that executes rules that map each group to a select message.

8. The method of claim 1, wherein the language characteristics on which the users are scored include type of vocabulary used.

9. The method of claim 8, wherein the language characteristics on which the users are scored also include morphology characteristics of the language.

10. The method of claim 9, wherein the morphology characteristics are one of: punctuation, capitalization, spelling errors, grammar errors, and acronyms.

11. The method of claim 1, wherein the language characteristics on which the users are scored include use of emoticons.

12. A system for identifying message content to send to users based on the users' language characteristics, the system comprising:

a server configured to perform the following:
obtaining user-generated content for a plurality of users, wherein each content item is associated with a user ID that uniquely identifies the user that generated the content item;

extracting language characteristics from the user-generated content;

assigning one or more language characteristic scores to each of the users;

clustering the users into groups using the language characteristic scores;

creating group definitions for each of the groups;

testing the responsiveness of each group to different message content by sending a plurality of test messages with different message content to at least a subset of users within each group and measuring the response rates to the test messages;

associating different message content with different language characteristic scores by identifying a message content to which each of the groups is most responsive and creating rules for each group based on the message content; and a client device configured to perform the following:
obtaining the group definitions from the server;
obtaining the rules for each group from the server;
obtaining user-generated content generated on the client device by a user of the client device;
extracting language characteristics from the user-generated content created on the client device;
assigning one or more language characteristic scores to the user of the client device;
using the rules to generate a message for the user based on the users having similar language characteristic score(s) and group definition(s); and
displaying the message to the user on the client device.

13. A computer system for identifying message content to send to users based on the users' language characteristics, the system comprising:

a processor;

a memory coupled to the processor, wherein the memory stores instructions that, when executed by the processor, causes the system to perform the operations of:

obtaining user-generated content for a plurality of users, wherein each content item is associated with a user ID that uniquely identifies the user that generated the content item;

extracting language characteristics from the user-generated content;

assigning one or more language characteristic scores to each of the users;

clustering the users into groups using the language characteristic scores;

testing the responsiveness of each group to different message content by sending a plurality of test messages with different message content to at least a subset of users within each group and measuring the response rates to the test messages;

associating different message content with different language characteristic scores by identifying a message content to which each of the groups is most responsive and associating the message content with the group;

obtaining user-generated content for a new user;

extracting language characteristics from the new user's user-generated content;

assigning one or more language characteristic scores to the new user; and sending a message to the new user with the message content previously associated with users having similar language characteristic score(s).

14. One or more non-transitory computer-readable media comprising computer program code that, when executed by a computer system, enables the computer system to perform the following method for identifying message content to send to users based on the users' language characteristics, the method comprising:

obtaining user-generated content for a plurality of users, wherein each content item is associated with a user ID that uniquely identifies the user that generated the content item;

extracting language characteristics from the user-generated content;

assigning one or more language characteristic scores to each of the users;

clustering the users into groups using the language characteristic scores;

testing the responsiveness of each group to different message content by sending a plurality of test messages with different message content to at least a subset of users within each group and measuring the response rates to the test messages;

associating different message content with different language characteristic scores by identifying a message content to which each of the groups is most responsive and associating the message content with the group;

obtaining user-generated content for a new user;

extracting language characteristics from the new user's user-generated content;

assigning one or more language characteristic scores to the new user; and     sending a message to the new user with the message content previously associated with users having similar language characteristic score(s).

15. The one or more non-transitory computer-readable media of claim 14, wherein testing the responsiveness of each group to different message content comprises testing the responsiveness of each group to offers of different products to identify a best product for each group.

16. The one or more non-transitory computer-readable media of claim 15, wherein, after a best product for each group is identified, testing the responsiveness of each group to certain vocabularies by sending test messages to at least a subset of users in each group that include an offer for the best product for the group and the certain vocabularies.

17. The one or more non-transitory computer-readable media of claim 16, wherein, for each group, the message content associated with the group comprises the best product for the group and the vocabulary to which the group is most responsive.

18. The one or more non-transitory computer-readable media of claim 14, wherein associating a message content with a group comprises associating a certain vocabulary with the group.

19. The one or more non-transitory computer-readable media of claim 14, wherein associating a message content with the group comprises associating certain vocabulary rules with the group.

20. The one or more non-transitory computer-readable media of claim 14, wherein the language characteristics on which the users are scored include type of vocabulary used.

21. The one or more non-transitory computer-readable media of claim 20, wherein the language characteristics on which the users are scored also include morphology characteristics of the language.

22. The one or more non-transitory computer-readable media of claim 21, wherein the morphology characteristics are one of: punctuation, capitalization, spelling errors, grammar errors, and acronyms.

23. The one or more non-transitory computer-readable media of claim 14, wherein the language characteristics on which the users are scored include use of emoticons.

\* \* \* \* \*